(12) United States Patent
Xu et al.

(10) Patent No.: US 10,818,311 B2
(45) Date of Patent: Oct. 27, 2020

(54) AUDITORY SELECTION METHOD AND DEVICE BASED ON MEMORY AND ATTENTION MODEL

(71) Applicant: INSTITUTE OF AUTOMATION, CHINESE ACADEMY OF SCIENCES, Beijing (CN)

(72) Inventors: Jiaming Xu, Beijing (CN); Jing Shi, Beijing (CN); Bo Xu, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 16/632,373

(22) PCT Filed: Nov. 14, 2018

(86) PCT No.: PCT/CN2018/115351
§ 371 (c)(1),
(2) Date: Jan. 20, 2020

(87) PCT Pub. No.: WO2019/096149
PCT Pub. Date: May 23, 2019

(65) Prior Publication Data
US 2020/0227064 A1    Jul. 16, 2020

(30) Foreign Application Priority Data

Nov. 15, 2017 (CN) ............ 2017 1 1127669

(51) Int. Cl.
*G10L 21/00* (2013.01)
*G10L 21/0272* (2013.01)
(Continued)

(52) U.S. Cl.
CPC ........ *G10L 21/0272* (2013.01); *G06F 17/16* (2013.01); *G06N 3/049* (2013.01); *G10L 25/30* (2013.01)

(58) Field of Classification Search
CPC combination set(s) only.
See application file for complete search history.

(56) References Cited

U.S. PATENT DOCUMENTS 6,161,086 A * 12/2000 Mukherjee ............ G10L 19/08
704/207
6,453,284 B1 * 9/2002 Paschall ................ G10L 21/028
381/94.3

(Continued)

FOREIGN PATENT DOCUMENTS

CN    104952448 A    9/2015
CN    106683661 A    5/2017

(Continued)

OTHER PUBLICATIONS

Wang et al "Deep Learning Based Binaural Speech Separation in Reverberant Environnnents" Published in: IEEE/ACM Transactions on Audio, Speech, and Language Processing ( vol. 25 , Issue: 5 , May 2017 ).*

*Primary Examiner* — Abdelali Serrou
(74) *Attorney, Agent, or Firm* — Bayramoglu Law Offices LLC

(57) ABSTRACT

An auditory selection method based on a memory and attention model, including: step S1, encoding an original speech signal into a time-frequency matrix; step S2, encoding and transforming the time-frequency matrix to convert the matrix into a speech vector; step S3, using a long-term memory unit to store a speaker and a speech vector corresponding to the speaker; step S4, obtaining a speech vector corresponding to a target speaker, and separating a target speech from the original speech signal through an attention (Continued)

selection model. A storage device includes a plurality of programs stored in the storage device. The plurality of programs are configured to be loaded by a processor and execute the auditory selection method based on the memory and attention model. A processing unit includes the processor and the storage device.

17 Claims, 7 Drawing Sheets

(51) Int. Cl.
*G06F 17/16* (2006.01)
*G06N 3/04* (2006.01)
*G10L 25/30* (2013.01)

(56) References Cited

U.S. PATENT DOCUMENTS

| | | | | |
|---|---|---|---|---|
| 7,533,017 | B2* | 5/2009 | Gotanda | G10L 21/0208 |
| | | | | 704/226 |
| 8,762,137 | B2* | 6/2014 | Fukuda | G10L 15/20 |
| | | | | 704/225 |
| 9,818,431 | B2* | 11/2017 | Yu | G10L 15/26 |
| 10,657,984 | B2* | 5/2020 | Nilsson | G10L 21/038 |
| 10,665,249 | B2* | 5/2020 | Yamaya | G06K 9/0057 |
| 2006/0200351 | A1* | 9/2006 | Acero | G10L 15/02 |
| | | | | 704/254 |
| 2007/0263823 | A1* | 11/2007 | Jalava | H04M 3/568 |
| | | | | 379/202.01 |
| 2016/0071526 | A1 | 3/2016 | Wingate et al. | |
| 2016/0099010 | A1* | 4/2016 | Sainath | G06N 3/0454 |
| | | | | 704/232 |
| 2016/0163310 | A1* | 6/2016 | Lee | G10L 25/30 |
| | | | | 704/232 |
| 2016/0189730 | A1* | 6/2016 | Du | G10L 21/0272 |
| | | | | 704/233 |
| 2017/0103752 | A1* | 4/2017 | Senior | G06N 3/0445 |
| 2017/0169815 | A1* | 6/2017 | Zhan | G10L 15/14 |
| 2017/0337924 | A1* | 11/2017 | Yu | G06K 9/624 |
| 2019/0139563 | A1* | 5/2019 | Chen | G10L 25/30 |
| 2019/0221312 | A1* | 7/2019 | Al Hasan | G06N 3/0481 |

FOREIGN PATENT DOCUMENTS

| | | |
|---|---|---|
| CN | 106683666 A | 5/2017 |
| CN | 108109619 A | 6/2018 |

* cited by examiner (a) Task-driven auditory attention    (b) Stimulus-driven auditory attention

AUDITORY SELECTION METHOD AND DEVICE BASED ON MEMORY AND ATTENTION MODEL

CROSS REFERENCE TO THE RELATED APPLICATIONS

This application is the national phase entry of International Application No. PCT/CN2018/115351, filed on Nov. 14, 2018, which is based upon and claims priority to Chinese Patent Application No. 201711127669.7, filed on Nov. 15, 2017, the entire contents of which are incorporated herein by reference.

TECHNICAL FIELD

The present disclosure belongs to the technical field of speech separation, and particularly relates to an auditory selection method and device based on a memory and attention model.

BACKGROUND

Electronic equipment and artificial intelligence have been developing rapidly in recent years. Human-computer speech interaction has become increasingly important and thus is widely used in real life and became a significant research area in the field of artificial intelligence. With human-computer speech interaction, the computer recognizes, analyzes, extracts the semantic feature information of the speech signal, compares the semantic feature information with the semantic features in the standard information database, and outputs the corresponding text or converts it into an expected output result. However, in practical applications, the process that the computer recognizes, analyzes, and extracts the semantic feature information of the speech signal, cannot produce satisfactory results due to a large amount of interference in a given environment. The speech separation technology has become an important method of human-computer speech interaction since the "Cocktail Party Problem" is presented.

The existing speech separation technology employs a supervised learning method. However, since the number of speakers is not known, the arrangement of supervised labels in a supervised learning method and other factors are uncertain in a real-life situation. The speech separation technology in the prior art does not have a satisfactory performance and produces unreliable results in a real world application. Moreover, since the dimensions of the memory unit are fixed, the supervised learning method in the prior art is difficult to effectively store the voiceprint information of different speakers who are unregistered or infrequently appear. As a result, under these circumstances, the speech separation would be inaccurate.

Therefore, it is necessary to solve the above-mentioned problems.

SUMMARY

In order to solve the above-mentioned problems in the prior art, namely, the problem of an undefined arrangement of supervised labels, the problem of a number of speakers being unknown, and the problem of a memory unit having a fixed dimension, an auditory selection method based on a memory and attention model is developed. According to the first aspect of the present disclosure, the method includes:

encoding an original speech signal into a matrix containing time-frequency dimensions;

encoding and transforming the matrix to convert the matrix into a speech vector;

using a long-term memory unit to store a speaker and a speech vector corresponding to the speaker; and obtaining a speech vector corresponding to a target speaker from the long-term memory unit; and according to the speech vector corresponding to the target speaker, separating a target speech from the original speech signals through an attention selection model.

In a preferred embodiment of the above method, the following steps are performed before the step of "encoding the original speech signal into the matrix containing the time-frequency dimensions":

resampling the original speech signal and performing a filtering operation on the resampled speech signal to reduce the sampling rate of the original speech signal.

In a preferred embodiment of the above method, the step of "encoding and transforming the matrix to convert the matrix into the speech vector" includes:

using a bi-directional long short-term memory (BiLSTM) network model to encode the matrix in sequential order and in reverse order, respectively, to obtain a first hidden layer vector and a second hidden layer vector, respectively;

fusing the first hidden layer vector with the second hidden layer vector at a corresponding time of the first hidden layer vector to obtain a third hidden layer vector;

converting the third hidden layer vector into the speech vector through a fully connected layer;

wherein, the time at which the matrix is encoded in sequential order and the time at which the matrix is encoded in reverse order correspond to each other.

In a preferred embodiment of the above method, the BiLSTM network model encodes the matrix to obtain the hidden layer vector according to the following formula:

$$i_t = \sigma(W_{xi}x_t + W_{hi}h_{t-1} + W_{ci}c_{t-1} + b_i)$$

$$f_t = \sigma(W_{xf}x_t + W_{hf}h_{t-1} + W_{cf}c_{t-1} + b_f)$$

$$c_t = f_t c_{t-1} + i_t \tan h(W_{xc}x_t + W_{hc}h_{t-1} + b_c)$$

$$o_t = \sigma(W_{xo}x_t + W_{ho}h_{t-1} + W_{co}c_{t-1} + b_o)$$

$$h_t = o_t \tan h(c_t)$$

where, i, f, c, o, and h respectively represent an input gate, a forget gate, a storage unit, an output gate, and a hidden layer vector of the BiLSTM network model respectively, σ represents the Sigmoid function, x represents the input vector, and t represents the time;

where, $W_{xi}$, $W_{hi}$, and $W_{ci}$ respectively represent encoding matrix parameters of an input vector $x_t$ in the input gate at the current time, the hidden layer vector $h_{t-1}$ in the input gate at the previous time, and the memory unit $c_{t-1}$ in the input gate at the previous time; and $b_i$ represents an information bias parameter in the input gate;

where, $W_{xf}$, $W_{hf}$, and $W_{cf}$ respectively represent encoding matrix parameters of the input vector $x_t$ in the forget gate at the current time, the hidden layer vector $h_{t-1}$ in the forget gate at the previous time, and the memory unit $c_{t-1}$ in the forget gate at the previous time; and $b_f$ represents an information bias parameter in the forget gate;

where, $W_{xc}$ and $W_{hc}$ respectively represent encoding matrix parameters of the input vector $x_t$ in the storage unit at the current time and the hidden layer vector $h_{t-1}$ in the storage unit at the previous time; and $b_c$ represents an information bias parameter in the storage unit; and where, $W_{xo}$, $W_{ho}$, and $W_{co}$ respectively represent encoding matrix parameter of the input vector $x_t$ in the output gate at the current time, the hidden layer vector $h_{t-1}$ in the output gate at the previous time, and an the memory unit $c_{t-1}$ in the output gate at the previous time; and $b_o$ represents an information bias parameter in the output gate.

In a preferred embodiment of the above method, the step of "fusing the first hidden layer vector with the second hidden layer vector" includes: adding the first hidden layer vector to the second hidden layer vector, or calculating an average value of the first hidden layer vector and the second hidden layer vector, or splicing the first hidden layer vector and the second hidden layer vector end to end.

In a preferred embodiment of the above method, the step of "using the long-term memory unit to store the speaker and the speech vector corresponding to the speaker" includes:

storing the speaker and the speech vector, corresponding to the speaker in the long-term memory unit, in the Key-Value form, wherein the "Key" stores an index of the speaker and the "Value" stores the speech vector corresponding to the speaker.

In a preferred embodiment of the above-mentioned method, after the step of "using the long-term memory unit to store the speaker and the speech vector corresponding to the speaker", the method further includes:

when the speaker stored in the long-term memory unit generates a new speech, extracting the speech vector of the speaker, and updating the speech vector of the speaker stored in the long-term memory unit to replace the original speech vector of the speaker.

In a preferred embodiment of the above-mentioned method, the step of "updating the speech vector of the speaker" includes after extracting the speech vector of the speaker, adding the speech vector to the original speech vector of the speaker in the long-term memory unit, and normalizing amplitudes in the obtained result. The specific formula is as follows.

$$v = \frac{q + v1}{\|q + v1\|},$$

wherein, q represents a new speech vector generated by the speaker, v1 represents the original speech vector of the speaker, and v represents an updated speech vector of the speaker.

In a preferred technical solution of the above-mentioned method, the step of "obtaining the speech vector corresponding to the target speaker from the long-term memory unit" includes:

establishing a mapping matrix between the speaker and the speech vector corresponding to the speaker; and according to the mapping matrix, obtaining a corresponding speech vector by a query of the target speaker;

alternatively, inputting the speech of the target speaker into the BiLSTM network model, and calculating an average value output by the BiLSTM network model in the time dimension, and using the average value as the speech vector corresponding to the target speaker.

In a preferred embodiment of the above-mentioned method, the step of "separating the target speech from the original speech signals by the attention selection model" includes:

calculating a similarity of the speech vector corresponding to the target speaker and the speech vector converted from the original speech signal to obtain an information masking of the target speech;

calculating weighted values of corresponding points in the information masking of the target speech and the original speech signal to obtain an output time-frequency spectrum of the target speech; and converting the output time-frequency spectrum into the target speech by the inverse short-time Fourier transform (iSTFT).

In a preferred embodiment of the above-mentioned method, the step of "encoding the original speech signal into the matrix containing the time-frequency dimensions" includes:

encoding the original speech signal into the matrix containing the time-frequency dimensions by the short-time Fourier transform (STFT).

In the second aspect of the present disclosure, a storage device is configured to store a plurality of programs, and the plurality of programs are configured to be loaded by a processor and executed to perform the auditory selection method based on the memory and attention model described above.

The third aspect of the present disclosure provides a processing unit, including a processor and a storage device; the processor is configured to execute each program; and the storage device is configured to store a plurality of programs. The plurality of programs that are configured to be loaded by a processor and executed to perform the auditory selection method based on the memory and attention model described above.

The auditory selection method, based on the memory and attention model provided by the present disclosure, uses a recurrent neural network to efficiently encode the speech signal, screens and separates the coded speech vector according to the time-ordered characteristics and the short-term stability of the speech signal.

In addition, in the present disclosure, a network of external long-term memory units is designed and configured to encode and store speech data, which can save and consolidate longer historical data information. In this way, the sound source information that is learned from the training data and stored in the memory is precisely selected and separated, and the information of the newly appeared sound source can be recognized and recorded. Therefore, the method of the present disclosure can directly test the overlapping speech without specifying the number of speakers.

DETAILED DESCRIPTION OF THE EMBODIMENTS

In order to reach the objectives, technical solutions, and advantages of the embodiments of the present disclosure, the technical solutions in the embodiments of the present disclosure will be expressly and completely described hereinafter with reference to the drawings. The described embodiments are only examples of the present disclosure rather than all possible examples. All other embodiments obtained by those having ordinary skills in the art, based on the embodiments of the present disclosure, without creative efforts would fall within the scope of protection of the present disclosure.

The preferred embodiments of the present disclosure will be described hereinafter with reference to the drawings. Those skilled in the art should understand that these embodiments are only intended to explain the technical principles of the present disclosure rather than limiting the scope of protection of the present disclosure.

Figure 1:
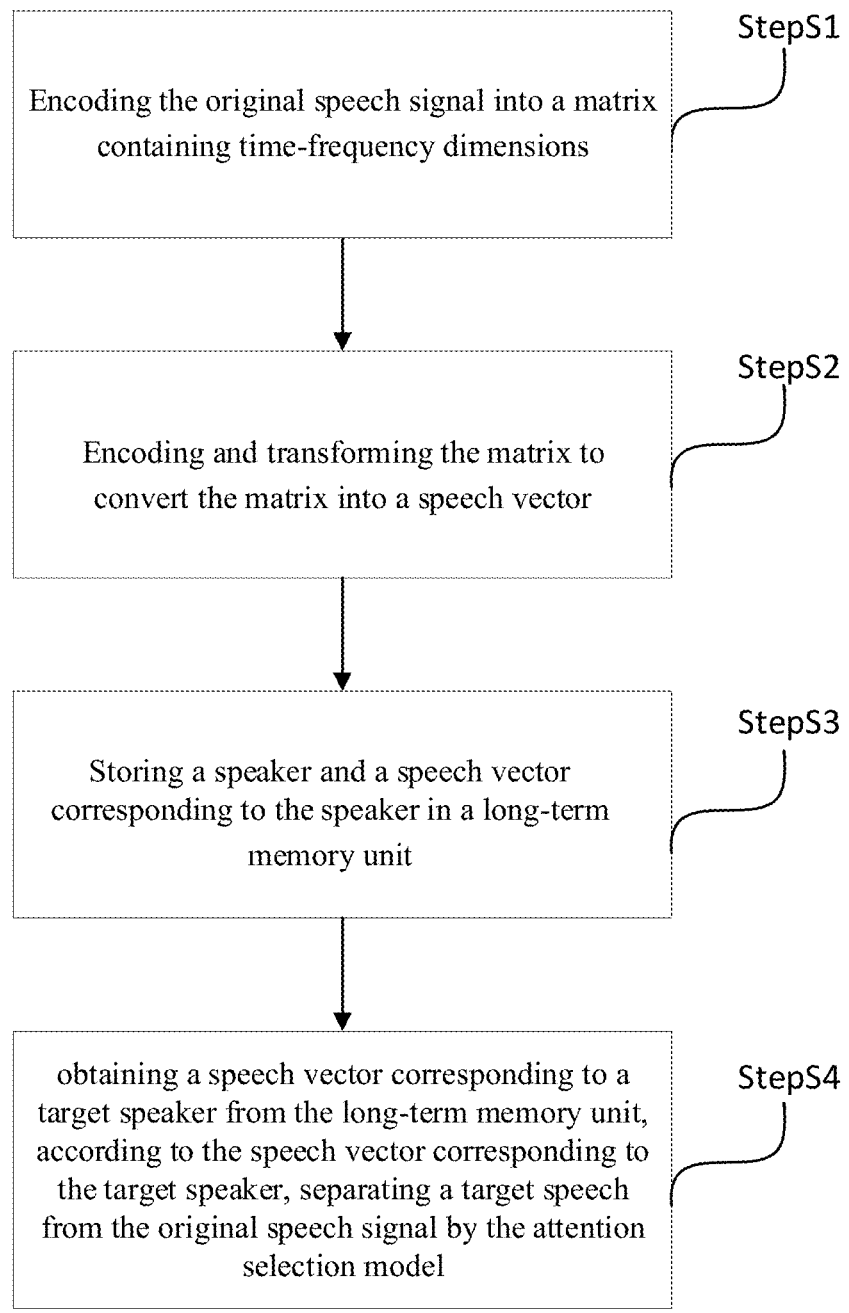
FIG. 1 is a schematic flow chart showing the auditory selection method based on the memory and attention model according to an embodiment of the present disclosure.

FIG. 1 shows a schematic flow chart of the auditory selection method based on the memory and attention model according to an embodiment of the present disclosure, including:

Step S1: The original speech signal is encoded into the matrix containing the time-frequency dimensions.

In a preferred embodiment of the invention, before the step of "the original speech signal is encoded into the matrix containing two dimensions of the time-frequency dimensions", the method further includes:

The original speech signal is resampled and the resampled speech signal is filtered to reduce the sampling rate of the original speech signal.

Further, the original speech signal is encoded by the short-time Fourier transform (STFT) into the matrix containing the time-frequency dimensions.

Figure 2:
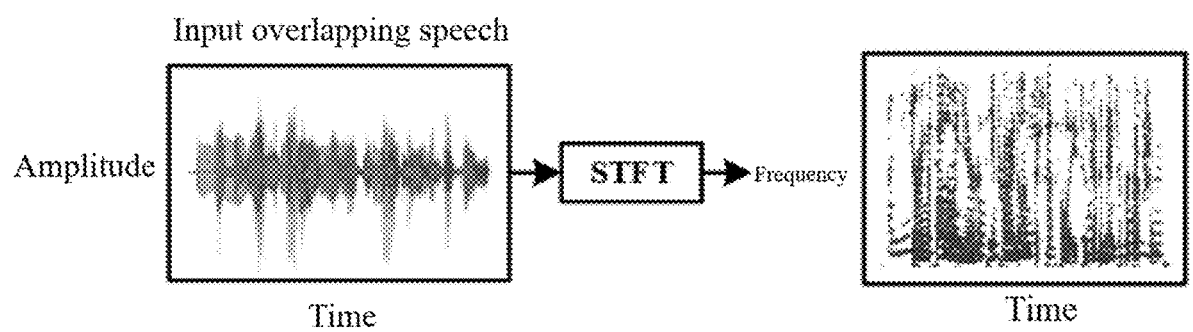
FIG. 2 is a schematic diagram showing that the original speech signal is converted into the time-frequency dimensions matrix according to an embodiment of the present disclosure.

Specifically, as shown in FIG. 2, FIG. 2 is a schematic diagram showing the original speech signal is converted into the time-frequency dimension matrix according to an embodiment of the present disclosure. The original speech signal is a time-domain signal that contains information in two dimensions, i.e. time and amplitude. Due to considerable interference existing in the actual scenarios, the desired signals need to be separated from other speech signals. In the present disclosure, the input original speech signal is decomposed into a two-dimensional time-frequency dimension matrix through the STFT, which eliminates interference, and analyzes the speech signal in the form of a time-frequency dimensions matrix. The signal characteristic at a certain time represents a period of a signal in a time window by the STFT, which can determine the frequency and the phase of the sine wave in a partial area of the time-varying signal.

In practical applications, in order to reduce the computational complexity of the whole method and the overhead of the memory in the computer, before the original speech signal is encoded into the matrix containing the time-frequency dimensions, the original speech data is sampled at a certain fixed interval in the time dimension, and is filtered by a low-pass filter in advance. For example, 16 Khz of the sampling rate of the original speech signal is resampled, and thus is reduced to 8 Khz.

Step S2: The matrix is encoded, transformed, and converted into the speech vector.

Figure 3:
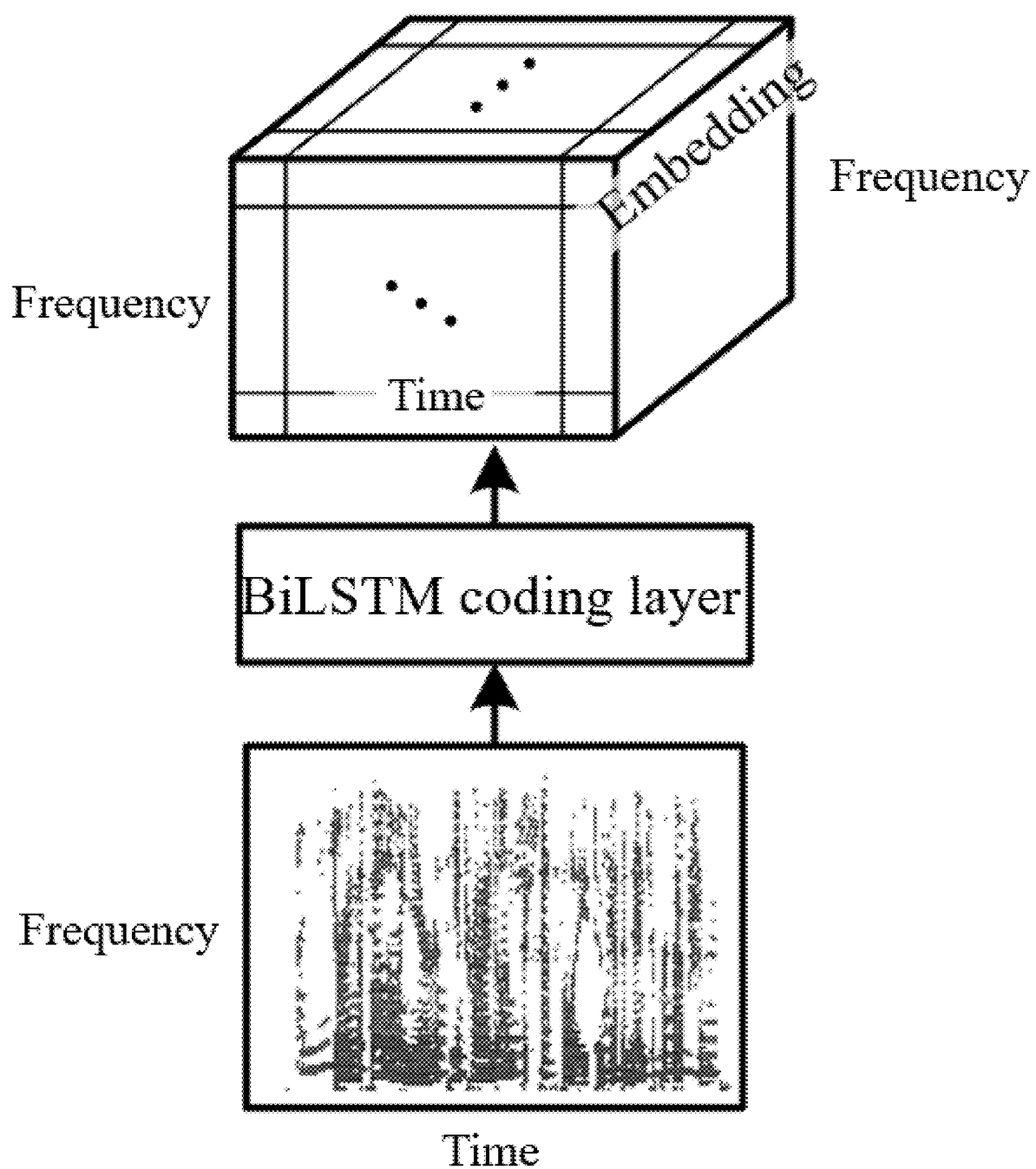
FIG. 3 is a schematic diagram showing the time-frequency dimensions matrix is expanded into the speech vector according to an embodiment of the present disclosure.

As shown in FIG. 3, FIG. 3 is a schematic diagram showing the time-frequency dimension matrix is expanded into the speech vector according to an embodiment of the present disclosure. Based on the time-frequency dimension matrix obtained in step S1, the time-frequency dimension matrix is encoded and transformed, wherein each time-frequency matrix is expanded into a vector, and the time-frequency matrix of the entire speech is expanded to a code containing three dimensions of time, frequency and embedding. The embedding in the neural network is indicative of expanding each point in specific data into multi-dimensional data. Taking word vectors as an example, each word is mapped from its simple one-dimensional ordinal number to become a multi-dimensional vector. In the present disclosure, the embedding is indicative of expanding each point in the original time-frequency of two dimensions into a multi-dimensional vector through the neural network. Thus, the original time-frequency, a two-dimensional matrix is transformed into the data containing three dimensions of time, frequency and embedding, i.e., the speech vector.

In a preferred embodiment of the present disclosure, the step of "encoding and transforming the matrix to convert the matrix into the speech vector" is as follows:

The BiLSTM network model encodes the matrix in a sequential order and in a reverse order, respectively, to obtain the first hidden layer vector and the second hidden layer vector, respectively.

The first hidden layer vector and the second hidden layer vector are fused to obtain the third hidden layer vector.

The third hidden layer vector is converted into the speech vector through the fully connected layer.

The time at which the matrix is encoded in sequential order and the time at which the matrix is encoded in reverse order correspond to each other.

The BiLSTM network model is configured to encode the matrix from two directions, i.e. in sequential order and in reverse order, respectively, then into a two-dimensional matrix with the size (t, $\mathcal{H}$), where $\mathcal{H}$ is a number of uniform hidden layer nodes in the BiLSTM network model, i.e., the dimension size in the hidden layer vector. In practical applications, the BiLSTM network model is an effective network structure model for processing time-series signals, such as speech, in the neural network. Recurrent neural networks are widely used for solving the variable-length input sequence problems. Long-distance historical information is stored in a recurrent hidden layer vector that synthesizes the current and the previous time information. The BiLSTM network model, in recurrent neural networks, is a model that can solve the gradient disappearance problem commonly occurring in the recurrent neural networks to a certain extent.

In practical applications, given an input sequence $x=(x_1, x_2, \ldots, x_n)$ where $x_t$ is an input vector at time t, in the present disclosure, $x_t$ can be regarded as a matrix of the input BiLSTM network model, and the hidden layer vector capable of storing information of the current time and the previous time can be calculated, as shown in formula (1):

$$i_t = \sigma(W_{xi}x_t + W_{hi}h_{t-1} + W_{ci}c_{t-1} + b_i)$$

$$f_t = \sigma(W_{xf}x_t + W_{hf}h_{t-1} + W_{cf}c_{t-1} + b_f)$$

$$c_t = f_t c_{t-1} + i_t \tan h(W_{xc}x_t + W_{hc}h_{t-1} + b_c)$$

$$o_t = \sigma(W_{xo}x_t + W_{ho}h_{t-1} + W_{co}c_{t-1} + b_o)$$

$$h_t = o_t \tan h(c_t) \tag{1}$$

where, i, f, c, o, and h respectively represent an input gate, a forget gate, a storage unit, an output gate, and a hidden layer vector of the BiLSTM network model, σ represents the Sigmoid function, x represents the input vector, and t represents the time;

where, $W_{xi}$, $W_{hi}$, and $W_{ci}$ respectively represent encoding matrix parameters of an input vector $x_t$ in the input gate at the current time, the hidden layer vector $h_{t-1}$ in the input gate at the previous time, and the memory unit $c_{t-1}$ in the input gate at the previous time; $b_i$ represents an information bias parameter in the input gate;

where, $W_{xf}$, $W_{hf}$, and $W_{cf}$ respectively represent encoding matrix parameters of the input vector $x_t$ in the forget gate at the current time, the hidden layer vector $h_{t-1}$ in the forget gate at the previous time, and the memory unit $c_{t-1}$ in the forget gate at the previous time; $b_f$ represents an information bias parameter in the forget gate;

where, $W_{xc}$ and $W_{hc}$ respectively represent encoding matrix parameters of the input vector $x_t$ in the storage unit at the current time, and the hidden layer vector $h_{t-1}$ in the storage unit at the previous time; $b_c$ represents an information bias parameter in the storage unit; and where, $W_{xo}$, $W_{ho}$, and $W_{co}$ respectively represent encoding matrix parameters of the input vector $x_t$ in the output gate at the current time, the hidden layer vector $h_{t-1}$ in the output gate at the previous time, and the memory unit $c_{t-1}$ in the output gate at the previous time; $b_o$ represents an information bias parameter in the output gate.

The architecture of BiLSTM network model includes three gates, i.e. the input gate i, the forget gate f, and the output gate c, and the memory unit o. Among them, the input gate can determine how the input vector changes the state of the memory unit, the output gate determines what effect the memory unit produces on the output, and the forget gate has a function of determining how much the memory unit remembers or forgets the state thereof at the previous time.

The typical LSTM network models have only one direction, and thus cannot utilize the information output subsequently. The BiLSTM network model, used in the present disclosure, can perform recurrent processing on the input sequence from two directions of the sequential order and the reverse order, and also make use of the information before and after the target time. In addition, the output of the previous layer network can be directly used as the input of the next layer network through the BiLSTM network model. The multi-layer network has a better representational capacity, capable of learning complex hidden layer characteristics.

In a preferred embodiment of the present disclosure, the step of "fusing the first hidden layer vector with the second hidden layer vector at the corresponding time of the first hidden layer vector" includes: adding the first hidden layer vector to the second hidden layer vector, or calculating an average value of the first hidden layer vector and the second hidden layer vector, or splicing the first hidden layer vector and the second hidden layer vector end to end.

After the matrix is encoded by the BiLSTM network model, in sequential order and in reverse order respectively, two hidden layer vectors are obtained, and are marked as the first hidden layer vector and the second hidden layer vector, respectively. The first hidden layer vector and the second hidden layer vector are merged into a third vector by a fusion mode, wherein the fusion method includes: adding, averaging, or directly splicing the two hidden layer vectors. For example, the input vector $x=(x_1, x_2, \ldots, x_n)$, $\vec{h} = (\vec{h}_1, \vec{h}_2, \ldots, \vec{h}_n)$ is obtained by encoding the input vector in the sequential order direction, and $\overleftarrow{h} = (\overleftarrow{h}_n, \overleftarrow{h}_{n-1}, \ldots, \overleftarrow{h}_1)$ is obtained by encoding the input vector in reverse order direction, where $\vec{h}_t$ and $\overleftarrow{h}_t$ are corresponding times that correspond to each other. The addition step of the method in fusion mode includes: vectors at the corresponding time in two directions are directly added together, and $(\vec{h}_1 + \overleftarrow{h}_1, \vec{h}_2 + \overleftarrow{h}_2, \ldots, \vec{h}_n + \overleftarrow{h}_n)$ is obtained. Similarly, the average value step includes calculating the average value of the vectors at each corresponding time. The splicing step includes connecting the vectors at each corresponding time end to end, and then transforming the two original two-dimensional matrices with a size of (t, $\mathcal{H}$) into (t, 2* $\mathcal{H}$).

The recoding and the dimension transformation are performed on the hidden layer vector after being fused, so that the two-dimensional matrix (t, $\mathcal{H}$) is transformed into a two-dimensional characteristic of (t, F*Embedding) through a fully connected layer, and the dimension transformation is further performed to obtain a three-dimensional characteristic representation of (t, F,Embedding), i.e., the representation of each time-frequency point in the speech is transformed from a number into a vector.

Step S3: The long-term memory unit is configured to store the speaker and the speech vector corresponding to the speaker.

In a preferred embodiment of the present disclosure, the speaker and the speech vector corresponding to the speaker are stored in the long-term memory unit in the Key-Value form, wherein the "Key" stores an index of the speaker and the "Value" stores the speech vector corresponding to the speaker.

Figure 4:
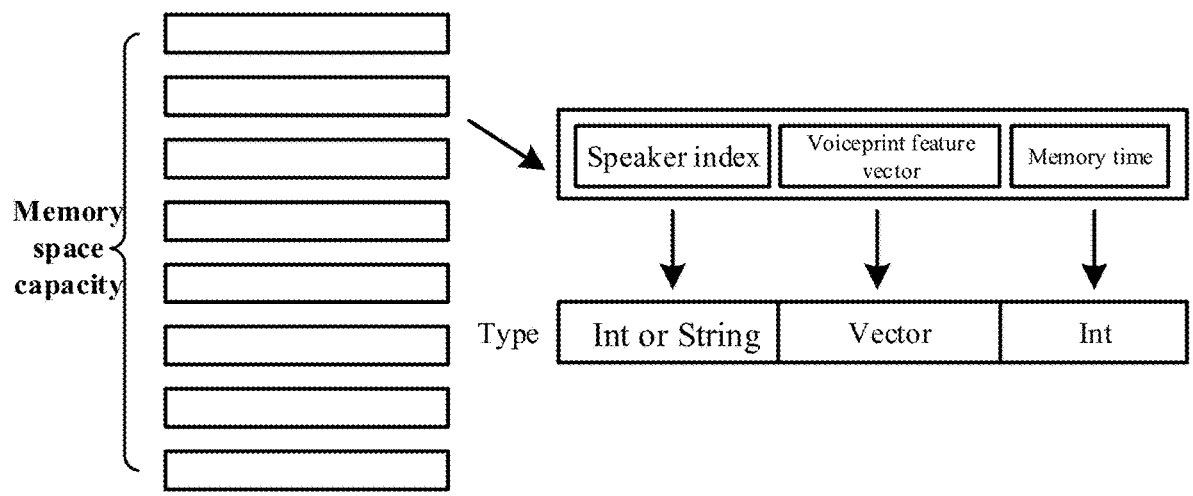
FIG. 4 is a schematic diagram showing a storage process of the memory unit according to an embodiment of the present disclosure.

As shown in FIG. 4, FIG. 4 is a schematic diagram showing a storage process of the memory unit according to an embodiment of the present disclosure. The speakers and their corresponding speech information characteristics recorded from the model training, or the testing process, are stored in the long-term memory unit with a memory space capacity of Memory-Size. Each unit stores data in the Key-Value form, wherein the "Key" stores the index of the speaker, and the "Value" stores the speech vector corresponding to the speaker. In order to better memorize the speech information, an "Age" is set in each unit to record the duration information of the information stored in the current memory unit.

It should be noted that, when the speaker stored in the long-term memory unit generates new speech, the speech vector of the speaker is extracted, and then the speech vector of the speaker is updated to replace the original speech vector of the speaker in the long-term memory unit.

In practical applications, the information of the speaker already existing in the long-term memory unit can also be updated according to the data, for example the sound of a strange person is memorized by repeatedly listening, thereby achieving memory consolidation. For example, the speech vector of the speaker (Spk) in the long-term memory unit is v1. When the speaker generates new speech, the speech vector of the speaker is extracted and updated to replace the original speech vector. In the embodiments of the present disclosure, "Spk" represents a determined speaker, and "Unk" represents an undetermined speaker.

After the speech vector of the speaker is extracted, the speech vector is added to the original speech vector of the speaker in the long-term memory unit, and amplitudes in the obtained result are normalized, as shown in formula (2):

$$v = \frac{q + v1}{\|q + v1\|} \quad (2)$$

wherein, q represents a new speech vector generated by the speaker, v1 represents the original speech vector of the speaker, and v represents an updated speech vector of the speaker.

In addition to the above-mentioned update method, the speech vector is updated by global averaging, accumulation, and other operations.

Step S4: The speech vector corresponding to the target speaker is obtained from the long-term memory unit. According to the speech vector corresponding to the target speaker, the target speech is separated from the original speech signals through the attention selection model.

The target speaker and the speech vector corresponding to the target speaker are stored by the long-term memory unit. After that, the target speech can be separated from the original speech signal through the attention selection model, provided that the target speaker is determined, and the speech signal corresponding to the target speaker is obtained in the long-term memory unit. The long-term memory unit integrated in the neural network can be used to save some rare information, which can effectively solve the problem that the training data and the test data in the traditional neural network must be distributed independently to work.

In a preferred embodiment of the embodiments of the present disclosure, the step of "obtaining the speech vector corresponding to the target speaker from the long-term memory unit" is as follows.

A mapping matrix is established between the speaker and the speech vector corresponding to the speaker. According to the mapping matrix, the corresponding speech vector is obtained by a query of the target speaker. Alternatively, the speech of the target speaker is input into the BiLSTM network model, the average value output by the BiLSTM network model is calculated in the time dimension and is used as the speech vector corresponding to the target speaker.

In practical applications, in order to separate the target speech from the mixed speech, the target speaker needs to be separated from the mixed crowd in the environment. After the target speaker is determined, the target speech vector is determined based on the established relationship between the speaker and the speech vector corresponding to the speaker. In the embodiments of the present disclosure, the speech vector corresponding to the target speaker is obtained from the long-term memory unit by using the following two methods.

In the first method, a mapping matrix is established between the speaker and the speech vector corresponding to the speaker. After the target speaker is determined, the corresponding speech vector is obtained by a lookup table from the mapping matrix. By this method, it is simple to establish the mapping matrix, while the speed in the actual query process is slow.

In the second method, after the target speaker is determined, the speech of the target speaker is input to the BiLSTM network model, and then the BiLSTM network model calculates the speech to obtain the output. After that, the output from the BiLSTM network model is calculated in time dimension to obtain the average value, and the average value is used as the speech vector corresponding to the target speaker. This method does not need to establish the relationship between the speaker and the corresponding speech vector. The speech vector of the speaker can be directly computed by the speech of the speaker, thereby quickly obtaining the result. Whereas the system requires a relatively high calculating power.

In a preferred embodiment of the present disclosure, the speech of the speaker is read or written by the long-term memory unit through different driving methods, and then the target speech of the target speaker is output from the long-term memory unit.

Figure 5:
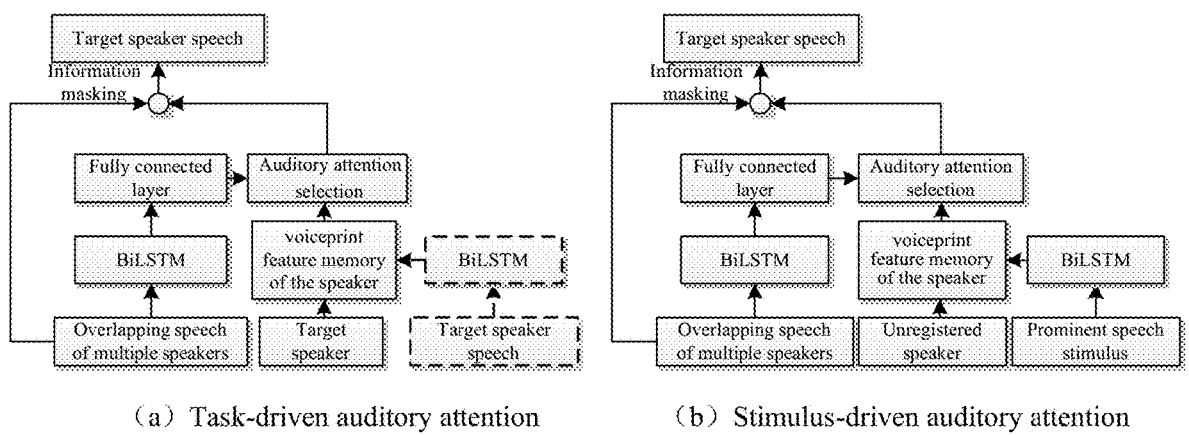
FIG. 5 is a schematic flow chart showing the auditory selection in different drive methods according to an embodiment of the present disclosure.

As shown in FIG. 5, FIG. 5 is a schematic flow chart showing the auditory selection in different driving methods according to an embodiment of the present disclosure. In specific application scenarios, the driving methods include a task-driven type and a stimulus-driven type. In a task-driven auditory attention scenario, the information of the target speaker is stored in the long-term memory unit, and the identity of the target speaker is determined. The long-term memory unit directly extracts the corresponding target speech vector by the serial number of the target speaker which is stored in advance. In a stimulus-driven auditory attention scenario, the long-term memory unit does not store the information of the target speaker. Therefore, the trained BiLSTM network model needs to extract a voiceprint feature on the prominent speech that attracts attention at the present time, and the voiceprint feature is online and updated in the long-term memory unit. Afterwards, the voiceprint feature is used for performing the auditory attention selection from the original speeches and separating the target speech.

In a preferred embodiment of the present disclosure, the step of "separating the target speech from the original speech signal by the attention selection model" is as follows.

The similarity calculation is performed on the speech vector corresponding to the target speaker and the speech vector converted from the original speech signal to obtain the information masking of the target speech.

The weighted values of the corresponding points in the information masking of the target speech and the original speech signal are computed to obtain the output time-frequency spectrum.

The output time-frequency spectrum is converted into the target speech by the iSTFT.

Figure 6:
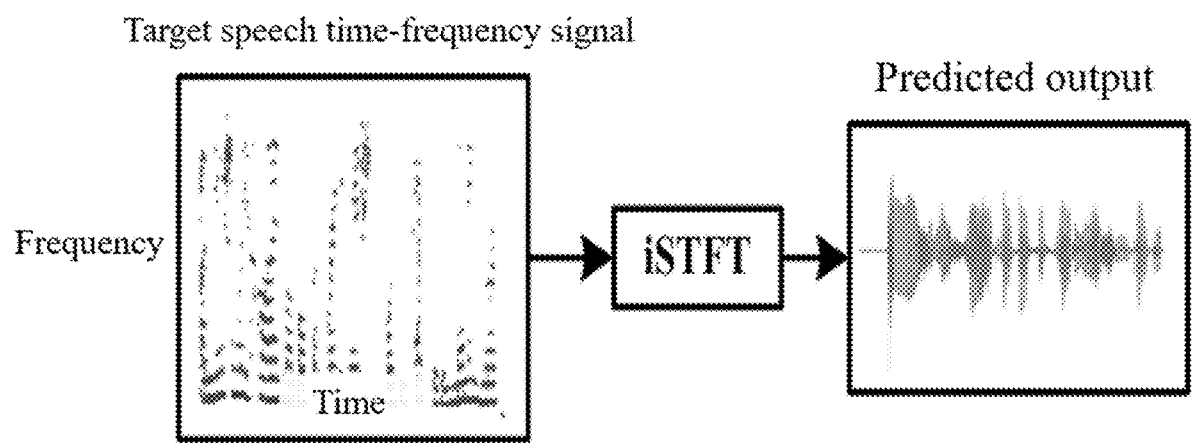
FIG. 6 is a schematic diagram showing the time-frequency spectrum of the target speech is converted into a target speech according to an embodiment of the present disclosure.

As shown in FIG. 6, FIG. 6 is a schematic diagram showing the time-frequency spectrum of the target speech is converted into the target speech according to an embodiment of the present disclosure. In the present disclosure, after the speech vector corresponding to the target speaker is obtained, the speech vector corresponding to the target speaker and the speech signal transformed from the original speech signal is calculated by a similarity calculation method to obtain the information masking of the target speech. The information (speech) masking refers to the ideal time-frequency floating value masking $M_s \epsilon R^{t*f}$ in speech separation, where t represents different times of the speech corresponding to different frames after sampling, and f represents the frequency corresponding to each frequency band after undergoing the short-time Fourier transform. After the floating value masking of the target speech is obtained, the floating value masking is multiplied by each point in the time-frequency spectrum of the original speech, to obtain the time-frequency spectrum of the target speech. After the time-frequency spectrum of the target speech is obtained, the time-frequency spectrum of the target speech is converted into the target speech by the iSTFT, and the similarity calculation method is specifically shown in formula (3):

$$\alpha_{t,f} = \text{sigmod}(g^T \tan h(Wv + Uh_{t,f})) \quad (3)$$

where, v represents the speech vector of the target user, $h_{t,f}$ represents the encoding vector of time-frequency points of the original speech, $\alpha_{t,f}$ represents the masking value of the time-frequency points of the original speech, W represents the spatial transformation matrix acting on the target user, U represents the spatial transformation matrix acting on the coding vector of each time-frequency point of the original speech, and g represents the similarity metric matrix after the former two vectors, i.e. the speech vector of the target user and the encoding vector of time-frequency points of the original speech, are transformed into the same space.

Figure 7:
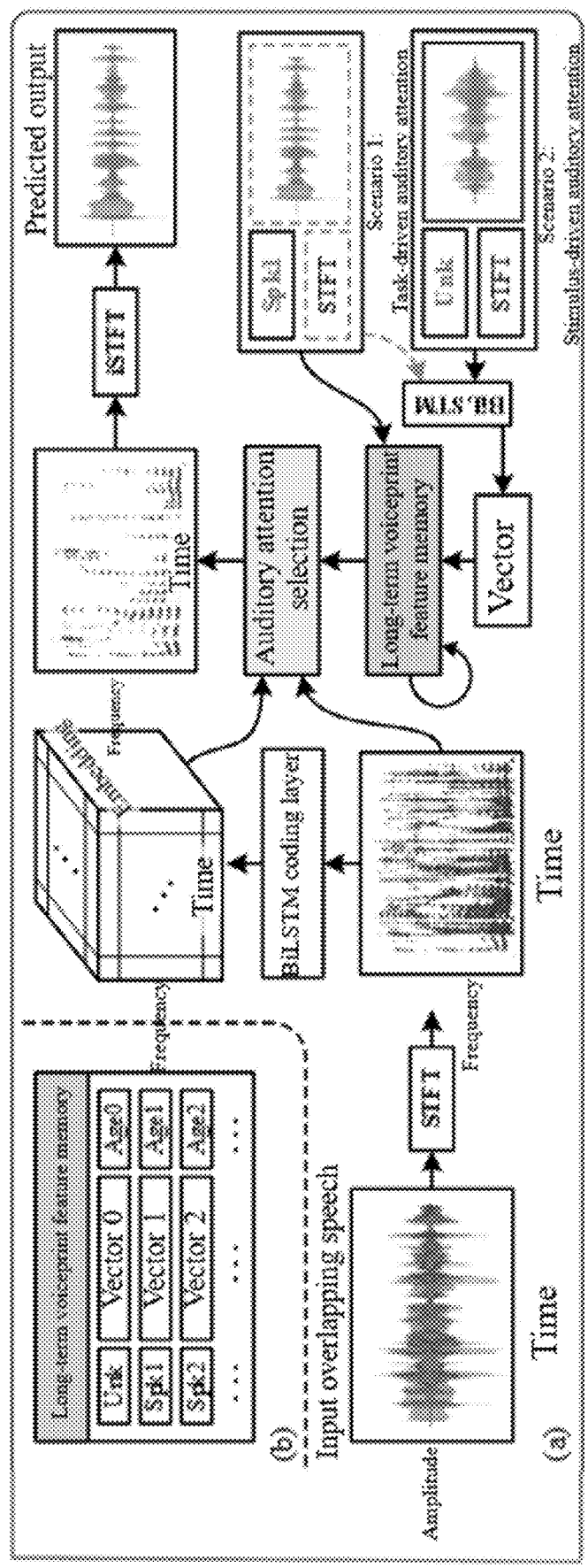
FIG. 7 is a schematic diagram showing a configuration of the auditory selection method based on the memory and attention model according to an embodiment of the present disclosure.

As shown in FIG. 7, FIG. 7 is a schematic diagram showing a configuration of the auditory selection method based on the memory and attention model according to an embodiment of the present disclosure. In the present disclosure, the original speech signal is encoded into the matrix containing the time-frequency dimensions, and the obtained matrix is encoded and transformed to obtain the speech vector. The long-term memory unit is configured to store the speaker and the speech vector corresponding to the speaker, and the speech vector corresponding to the target speaker is obtained from the long-term memory unit. According to the speech vector corresponding to the target speaker, the target speech is separated from the original speech signals by the attention selection model. Compared with the prior art, the present disclosure can directly test the overlapping speech without fixing or specifying the number of speakers.

Based on the above method, the target speech of a specific speaker can be separated from the original speech. In order to accurately evaluate the performance of the auditory selection and the target speech separation, according to the method of the present disclosure, the GNSDR (global signal-to-distortion improvement) in the BSS_EVAL (blind source separation evaluation) tool in speech separation is used as a measurement index to test the performance of the auditory selection or speech separation of the output.

Table 1 shows the parameters employed in the experiment of the present disclosure. In the experiment of the present disclosure, the English speech data set, Wall Street Journal, and the Chinese speech data set, Tsinghua Chinese 30 hour, are configured to construct the original speech data and the target separated speech data, and are categorized into a training data set, a validation data set, and a test data set according to a certain scale.

TABLE 1 setting result of the experimental data sets

| data set | Average speech length | Task-driven | | | | Stimulus-driven | |
|---|---|---|---|---|---|---|---|
| | | Male-female ratio | Training | Validation | Test | Male-female ratio | Test |
| WSJ0 | 5.03 s | 4:6 | 4,410 | 810 | 2,250 | 2:3 | 500 |
| THCHS-30 | 9.15 s | 2:8 | 4,410 | 810 | 2,250 | 1:4 | 500 |

Specifically, referring to Table 1, ten speakers (each speaker having multiple different voices) are selected from each of the two data sets to construct the task-driven data, wherein the ten speakers in WSJ0 include four men and six women, and the ten speakers in THCHS-30 include 2 men and 8 women. Any two speeches respectively from two speakers randomly selected from the ten selected people are mixed to form 4410 training mixed speech data samples, 810 validation mixed speech data samples, and 2250 test mixed speech data samples. Meanwhile, five speakers, other than the previous ten speakers, are randomly selected (each of the five speakers has multiple different voices). The 500 speech data samples are obtained by mixing in the same manner as the above-mentioned method, and are used for testing the performance of the network model trained by the task-driven type under the stimulus-driven condition.

In order to perform a fair and reasonable comparison, all the experiments of the method and the comparison method of the present disclosure all adopt the same parameter settings, and the adopted same parameters are as follows:

The resampling rate is 8 Khz, the window length of the STFT is 32 ms, the sine window function is adopted, the length of the jump size is 16 ms, the layer number of the BiLSTM network model is 2, the size of the hidden layer unit is 300, the output dimension is 40, and Embedding is 40.

Table 2 shows the comparison results of the task-driven type and the comparison method of the present disclosure. After the training in the method and the comparison method is completed, the comparison results of the WSJ0 and THCHS-30 task-driven test data sets are shown in Table 2. The data in the table are GNSDR by using different methods, and each experiment is repeatedly performed five times to calculate the average result.

TABLE 2

Comparison results of the task-driven type and the comparison method

| | WSJ0 | | | THCHS-30 | | |
|---|---|---|---|---|---|---|
| Method | Two speakers | Three speakers | Two speakers + noise | Two speakers | Three speakers | Two speakers + noise |
| DC | 4.78 ± 0.23 | 4.09 ± 0.02 | 2.61 ± 0.01 | 2.83 ± 0.92 | 4.01 ± 0.07 | 2.77 ± 0.12 |
| DC (−40) | 7.47 ± 0.07 | 5.32 ± 0.02 | 3.29 ± 0.04 | 6.56 ± 0.08 | 5.48 ± 0.15 | 2.81 ± 0.23 |
| DC (−60) | 6.89 ± 0.20 | 4.95 ± 0.04 | 3.23 ± 0.10 | 6.36 ± 0.05 | 5.36 ± 0.10 | 2.84 ± 0.16 |
| DC (−80) | 6.82 ± 0.05 | 4.94 ± 0.12 | 3.74 ± 0.26 | 5.76 ± 0.33 | 4.82 ± 0.17 | 3.49 ± 0.22 |
| ASAM-spk | 8.16 ± 0.07 | 5.06 ± 0.07 | 3.92 ± 0.16 | 6.81 ± 0.15 | 5.54 ± 0.15 | 4.43 ± 0.38 |

TABLE 2-continued

Comparison results of the task-driven type and the comparison method

| | WSJ0 | | | THCHS-30 | | |
|---|---|---|---|---|---|---|
| Method | Two speakers | Three speakers | Two speakers + noise | Two speakers | Three speakers | Two speakers + noise |
| ASAM | 7.46 ± 0.11 | 5.02 ± 0.05 | 4.36 ± 0.13 | 6.05 ± 0.26 | 5.02 ± 0.11 | 3.95 ± 0.48 |

The deep clustering (DC) method, used as the comparison method, includes the original method and various setting variants thereof. Specifically, DC (−40) is indicative of setting the threshold value of the background noise which needs to be omitted as −40 dB in the deep clustering method, i.e., the value of the time-frequency point that is 40 dB or less lower than the highest value of the time-frequency signal of the original speech is omitted, which is set to be 0. The DC (−60) method and the DC (−80) method are similar to the DC (−40) described above, and the background noise points are not omitted in the original DC method. The ASAM-spk method is to establish a mapping matrix between a speaker and a speech vector corresponding to the speaker. The ASAM method is to input the speech of the speaker into the BiLSTM network model and calculate the average value output by the BiLSTM network model.

In the test experimental data in Table 2, the two speakers refer to mixing the voices of the original two different speakers. The three speakers refer to adding a speech of another speaker based on the original test data. Two speakers+noise is adding a noise acquired from a street intersection environment based on the original test data. Another speaker and noise are added to compare the method in the present disclosure, which can flexibly deal with the problem of the inconsistent number of speakers in the training and test data and has a good anti-noise performance.

Experimental results show that, in a task-driven setting, the training is only performed based on the overlapping speech signal of two speakers, nonetheless, the method of the present disclosure can also fully solve the situation that the number of speakers of the test data is not constant, without the need to inform the number of speakers. The ASAM-spk in this method achieves the best results under most of the settings. The ASAM method is also approximately comparable to the best available DC (−40) method. After the noise is added, this method also shows a good anti-noise performance. In addition, the deep clustering method requires a manually preset threshold value of the background noise, so as to obtain a preferable performance, while the method of the present disclosure does not need to set the threshold value and can learn by itself through the network.

Table 3 shows the comparison results of the stimulus-driven type and the comparison method of the present disclosure. After the training in the method and the comparison method is completed, the comparison results of the WSJ0 and THCHS-30 stimulus-driven test data sets are as follows. The data in the table are GNSDR by adopting different methods.

TABLE 3

Comparison results of the stimulus-driven type and the comparison method

| Method | WSJ0 | THCHS-30 |
|---|---|---|
| DC | 3.45 | 1.56 |
| DC(−40) | 5.84 | 5.34 |
| DC(−60) | 5.23 | 5.17 |
| DC(−80) | 4.98 | 4.56 |
| ASAM | 6.17 | 5.44 |

The stimulus-driven experiment is to select the speech from one of the speakers in the overlapping speech of the speakers who have not been heard in the previous training. The stimulus of another section of the prominent speech is used as the original data extracted from the voiceprint of the speaker. According to the experimental results, although the overlapping speech has never been heard before, the method of the present disclosure can still successfully select the speech of a designated speaker. Compared with the traditional method of the neural network that fails to use the untrained data set, the long-term memory unit integrated in the neural network in the method can be used to save some rare information, which can effectively solve the problem that the training data and the test data in the traditional neural network must be distributed independently to work. Therefore, the method of the present disclosure has good adaptability and universality, and is available and useful for selecting voiceprint information.

Those skilled in the art can clearly understand that, in order to easily and succinctly describe the present disclosure, the specific working process and the related description of the storage device of the embodiments of the present disclosure can refer to the corresponding process of the auditory selection method based on the memory and attention model in the foregoing embodiment, and has the same advantages as the above-mentioned method, which is not repeatedly described herein.

Those skilled in the art can clearly understand that, in order to easily and succinctly describe the present disclosure, the specific working process and the related description of the processing unit of the embodiments of the present disclosure can refer to the corresponding process of the auditory selection method based on the memory and attention model in the foregoing embodiment, and has the same advantages as the above-mentioned method, which is not repetitively described herein.

Those skilled in the art should know that the method and steps of the described embodiments can be implemented by electronic hardware, computer software, or a combination of the two. In order to clearly illustrate the interchangeability of electronic hardware and software, the composition and steps of each embodiment have been described generally in terms of functions in the above-mentioned description.

Whether these functions are performed by electronic hardware or software depends on the specific application and design constraints of the technical solution. Those skilled in the art may use different methods to achieve the described functions for each specific application, and such implementation should fall within the scope of the present disclosure.

Hereto, the technical solution of the present disclosure is described with reference to the preferred embodiments shown in the drawings. However, as those skilled in the art know, the scope of protection of the present disclosure is obviously not limited to these specific embodiments. Those skilled in the art can make equivalent changes or replacements to related technical features without departing from the principle of the present disclosure, and these changes or the replaced technical solutions would fall within the scope of protection of the present disclosure.

What is claimed is:

1. An auditory selection method based on a memory and attention model, comprising:

encoding an original speech signal into a matrix containing time-frequency dimensions;

encoding and transforming the matrix containing the time-frequency dimensions to convert the matrix containing the time-frequency dimensions into a speech vector using a bi-directional long short-term memory (BiLSTM) network model to encode the matrix containing the time-frequency dimensions in a sequential order and in a reverse order, respectively, to obtain a first hidden layer vector and a second hidden layer vector, respectively;

wherein, the BiLSTM network model is configured to encode the matrix containing the time-frequency dimensions to obtain a hidden layer vector, and a formula of the BiLSTM network model comprises:

$i_t = \sigma(W_{xi}x_t + W_{hi}h_{t-1} + W_{ci}c_{t-1} + b_i)$ $f_t = \sigma(W_{xf}x_t + W_{hf}h_{t-1} + W_{cf}c_{t-1} + b_f)$ $c_t = f_t c_{t-1} + i_t \tan h(W_{xc}x_t + W_{hc}h_{t-1} + b_c)$ $o_t = \sigma(W_{xo}x_t + W_{ho}h_{t-1} + W_{co}c_{t-1} + b_o)$ $h_t = o_t \tan h(c_t)$ where, i, f, c, o, and h respectively represent an input gate, a forget gate, a storage unit, an output gate, and the hidden layer vector of the BiLSTM network model, σ represents a Sigmoid function, x represents an input vector, and t represents a time;

where, $W_{xi}$, $W_{hi}$, and $W_{ci}$ respectively represent an encoding matrix parameter of an input vector $x_t$ in the input gate at a current time, an encoding matrix parameter of the hidden layer vector $h_{t-1}$ in the input gate at a previous time, and an encoding matrix parameter of a memory unit $C_{t-1}$ in the input gate at the previous time; $b_i$ represents an information bias parameter in the input gate;

where, $W_{xf}$, $W_{hf}$, and $W_{cf}$ respectively represent an encoding matrix parameter of the input vector $x_t$ in the forget gate at the current time, an encoding matrix parameter of the hidden layer vector $h_{t-1}$ in the forget gate at the previous time, and an encoding matrix parameter of the memory unit $C_{t-1}$ in the forget gate at the previous time; $b_f$ represents an information bias parameter in the forget gate;

where, $W_{xc}$ and $W_{hc}$ respectively represent an encoding matrix parameter of the input vector $X_t$ in the storage unit at the current time and an encoding matrix parameter of the hidden layer vector $h_{t-1}$ in the storage unit at the previous time; $b_c$ represents an information bias parameter in the storage unit; and where, $W_{xo}$, $W_{ho}$, and $W_{co}$ respectively represent an encoding matrix parameter of the input vector $x_t$ in the output gate at the current time, an encoding matrix parameter of the hidden layer vector $h_{t-1}$ in the output gate at the previous time, and an encoding matrix parameter of the memory unit $C_{t-1}$ in the output gate at the previous time; $b_o$ represents an information bias parameter in the output gate;

storing a speaker and a speech vector corresponding to the speaker in a long-term memory unit;

obtaining a speech vector corresponding to a target speaker from the long-term memory unit; and according to the speech vector corresponding to the target speaker, separating a target speech from the original speech signal by an attention selection model.

2. The auditory selection method based on the memory and attention model according to claim 1, wherein, before "encoding the original speech signal into the matrix containing the time-frequency dimensions", the auditory selection method further comprises:

resampling the original speech signal to form a resampled speech signal, and filtering the resampled speech signal to reduce a sampling rate of the original speech signal.

3. The auditory selection method based on the memory and attention model according to claim 2, wherein, the step of "encoding and transforming the matrix containing the time-frequency dimensions to convert the matrix containing the time-frequency dimensions into the speech vector" comprises:

fusing the first hidden layer vector with the second hidden layer vector at a time corresponding to the first hidden layer vector to obtain a third hidden layer vector; and converting the third hidden layer vector into the speech vector through a fully connected layer;

wherein, the matrix containing the time-frequency dimensions is encoded in sequential order at a first time and the matrix containing the time-frequency dimensions is encoded in reverse order at a second time, and the first time corresponds to the second time.

4. The auditory selection method based on the memory and attention model according to claim 3, wherein, the step of "fusing the first hidden layer vector with the second hidden layer vector at the time corresponding to the first hidden layer vector" comprises:

adding the first hidden layer vector to the second hidden layer vector, or calculating an average value of the first hidden layer vector and the second hidden layer vector, or splicing the first hidden layer vector and the second hidden layer vector end to end.

5. The auditory selection method based on the memory and attention model according to claim 1, wherein, the step of "storing the speaker and the speech vector corresponding to the speaker in the long-term memory unit" comprises:

storing the speaker and the speech vector corresponding to the speaker in the long-term memory unit in a Key-Value form, wherein a Key is configured to store an index of the speaker and a Value is configured to store the speech vector corresponding to the speaker.

6. The auditory selection method based on the memory and attention model according to claim 5, wherein, after "storing the speaker and the speech vector corresponding to the speaker in the long-term memory unit", the auditory selection method further comprises:

when the speaker generates a new speech, extracting a new speech vector of the new speech of the speaker, and updating the speech vector of the speaker stored in the long-term memory unit to replace an original speech vector of the speaker with the new speech vector.

7. The auditory selection method based on the memory and attention model according to claim 6, wherein, the step of "updating the speech vector of the speaker" comprises:
after the new speech vector of the speaker is extracted, adding the new speech vector to the original speech vector of the speaker in the long-term memory unit, normalizing amplitudes in an obtained result, wherein a formula of normalizing the amplitudes in the obtained result is as follows:

$$v = \frac{q+v1}{\|q+v1\|},$$

where, q represents a new speech vector generated by the speaker, v1 represents the original speech vector of the speaker, and V represents an updated speech vector of the speaker.

8. The auditory selection method based on the memory and attention model according to claim 1, wherein, the method of "obtaining the speech vector corresponding to the target speaker from the long-term memory unit" comprises:
establishing a mapping matrix between the speaker and the speech vector corresponding to the speaker; according to the mapping matrix, obtaining a speech vector corresponding to a query of the target speaker; or
inputting a speech of the target speaker into the BiLSTM network model, and calculating an average value output by the BiLSTM network model in a time dimension, and using the average value output by the BiLSTM network model in the time dimension as the speech vector corresponding to the target speaker.

9. The auditory selection method based on the memory and attention model according to claim 8, wherein, the step of "separating the target speech from the original speech signal by the attention selection model" comprises:
calculating a similarity of the speech vector corresponding to the target speaker and the speech vector converted from the original speech signal to obtain an information masking of the target speech;
calculating weighted values of corresponding points in the information masking of the target speech and the original speech signal to obtain an output time-frequency spectrum of the target speech; and
converting the output time-frequency spectrum into the target speech by an inverse short-time Fourier transform (iSTFT).

10. The auditory selection method based on the memory and attention model according to claim 2, wherein, the method of "encoding the original speech signal into the matrix containing the time-frequency dimensions" comprises:
encoding the original speech signal into the matrix containing the time-frequency dimensions by a short-time Fourier transform (STFT).

11. A system for speech separation and auditory selection based on a memory and attention model, the system comprising:

a processor and a storage device, wherein the storage device stores instructions that, when executed by the processor, causes the processor to:
encode an original speech signal into a matrix containing time-frequency dimensions;
encode and transform the matrix containing the time-frequency dimensions to convert the matrix containing the time-frequency dimensions into a speech vector using a bi-directional long short-term memory (BiLSTM) network model to encode the matrix containing the time-frequency dimensions in a sequential order and in a reverse order, respectively, to obtain a first hidden layer vector and a second hidden layer vector, respectively;
wherein, the BiLSTM network model is configured to encode the matrix containing the time-frequency dimensions to obtain a hidden layer vector, and a formula of the BiLSTM network model comprises:

$$i_t = \sigma(W_{xi}x_t + W_{hi}h_{t-1} + W_{ci}c_{t-1} + b_i)$$

$$f_t = \sigma(W_{xf}x_t + W_{hf}h_{t-1} + W_{cf}c_{t-1} + b_f)$$

$$c_t = f_t c_{t-1} + i_t \tan h(W_{xc}x_t + W_{hc}h_{t-1} + b_c)$$

$$o_t = \sigma(W_{xo}x_t + W_{ho}h_{t-1} + W_{co}c_{t-1} + b_o)$$

$$h_t = o_t \tan h(c_t)$$

where, i, f, C, o, and h respectively represent an input gate, a forget gate, a storage unit, an output gate, and the hidden layer vector of the BiLSTM network model, σ represents a Sigmoid function, x represents an input vector, and t represents a time;
where, $W_{xi}$, $W_{hi}$, and $W_{ci}$ respectively represent an encoding matrix parameter of an input vector $x_t$ in the input gate at a current time, an encoding matrix parameter of the hidden layer vector $h_{t-1}$ in the input gate at a previous time, and an encoding matrix parameter of a memory unit $C_{t-1}$ in the input gate at the previous time; $b_i$ represents an information bias parameter in the input gate;
where, $W_{xf}$, $W_{hf}$, and $W_{cf}$ respectively represent an encoding matrix parameter of the input vector $x_t$ in the forget gate at the current time, an encoding matrix parameter of the hidden layer vector $h_{t-1}$ in the forget gate at the previous time, and an encoding matrix parameter of the memory unit $C_{t-1}$ in the forget gate at the previous time; $b_f$ represents an information bias parameter in the forget gate;
where, $W_{xc}$ and $W_{hc}$ respectively represent an encoding matrix parameter of the input vector $X_t$ in the storage unit at the current time and an encoding matrix parameter of the hidden layer vector $h_{t-1}$ in the storage unit at the previous time; $b_c$ represents an information bias parameter in the storage unit and
where, $W_{xo}$, $W_{ho}$, and $W_{co}$ respectively represent an encoding matrix parameter of the input vector $X_t$ in the output gate at the current time, an encoding matrix parameter of the hidden layer vector $h_{t-1}$ in the output gate at the previous time, and an encoding matrix parameter of the memory unit $C_{t-1}$ in the output gate at the previous time; $b_o$ represents an information bias parameter in the output gate;
store a speaker and a speech vector corresponding to the speaker in a long-term memory unit:
obtain a speech vector corresponding to a target speaker from the long-term memory unit and according to the speech vector corresponding to the target speaker, separate a target speech from the original speech signal by an attention selection model.

12. The storage device according to claim 11, wherein, before "encoding the original speech signal into the matrix containing the time-frequency dimensions", the auditory selection method further comprises:
resampling the original speech signal to form a resampled speech signal, and filtering the resampled speech signal to reduce a sampling rate of the original speech signal.

13. The storage device according to claim 12, wherein, the step of "encoding and transforming the matrix containing the time-frequency dimensions to convert the matrix containing the time-frequency dimensions into the speech vector" comprises:
fusing the first hidden layer vector with the second hidden layer vector at a time corresponding to the first hidden layer vector to obtain a third hidden layer vector; and
converting the third hidden layer vector into the speech vector through a fully connected layer;
wherein, the matrix containing the time-frequency dimensions is encoded in sequential order at a first time and the matrix containing the time-frequency dimensions is encoded in reverse order at a second time, and the first time corresponds to the second time.

14. The storage device according to claim 13, wherein, the step of "fusing the first hidden layer vector with the second hidden layer vector at the time corresponding to the first hidden layer vector" comprises: adding the first hidden layer vector to the second hidden layer vector, or calculating an average value of the first hidden layer vector and the second hidden layer vector, or splicing the first hidden layer vector and the second hidden layer vector end to end.

15. The storage device according to claim 11, wherein, the step of "storing the speaker and the speech vector corresponding to the speaker in the long-term memory unit" comprises:
storing the speaker and the speech vector corresponding to the speaker in the long-term memory unit in a Key-Value form, wherein a Key is configured to store an index of the speaker and a Value is configured to store the speech vector corresponding to the speaker.

16. The storage device according to claim 15, wherein, after "storing the speaker and the speech vector corresponding to the speaker in the long-term memory unit", the auditory selection method further comprises:
when the speaker generates a new speech, extracting a new speech vector of the new speech of the speaker, and updating the speech vector of the speaker stored in the long-term memory unit to replace an original speech vector of the speaker with the new speech vector.

17. The storage device according to claim 16, wherein, the step of "updating the speech vector of the speaker" comprises:
after the new speech vector of the speaker is extracted, adding the new speech vector to the original speech vector of the speaker in the long-term memory unit, normalizing amplitudes in an obtained result, and a formula of normalizing the amplitudes in the obtained result is as follows:

$$v = \frac{q+v1}{\|q+v1\|},$$

where, q represents a new speech vector generated by the speaker, v1 represents the original speech vector of the speaker, and v represents an updated speech vector of the speaker.

* * * * *